United States Patent
Chen et al.

(10) Patent No.: US 12,007,639 B2
(45) Date of Patent: *Jun. 11, 2024

(54) SYSTEMS WITH ADJUSTABLE WINDOW TRANSMISSION AND HAZE

(71) Applicant: Apple Inc., Cupertino, CA (US)

(72) Inventors: Yuan Chen, Campbell, CA (US);
Donald R. Monroe, Los Gatos, CA (US); Peter F. Masschelein, Campbell, CA (US); Stephen B. Lynch, Portola Valley, CA (US); Xiaokai Li, Mountain View, CA (US); Zhibing Ge, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,587

(22) Filed: Jan. 19, 2023

(65) Prior Publication Data
US 2023/0152620 A1    May 18, 2023

Related U.S. Application Data

(63) Continuation of application No. 17/466,269, filed on Sep. 3, 2021, now Pat. No. 11,598,985.
(Continued)

(51) Int. Cl.
*G02F 1/1333* (2006.01)
*B60J 3/00* (2006.01)
(Continued)

(52) U.S. Cl.
CPC ............ *G02F 1/1334* (2013.01); *B60J 3/007* (2013.01); *B60J 3/04* (2013.01); *G02F 1/0121* (2013.01);
(Continued)

(58) Field of Classification Search
CPC ................ G02F 1/1334; G02F 1/0121; G02F 1/133365; G02F 1/13725; G02F 1/13737;
(Continued)

(56) References Cited

U.S. PATENT DOCUMENTS 5,508,831 A    4/1996  Nakamura et al.
7,754,295 B2   7/2010  Chari et al.
(Continued)

FOREIGN PATENT DOCUMENTS

WO    2020084448 A1    4/2020

*Primary Examiner* — Donald L Raleigh
(74) *Attorney, Agent, or Firm* — Treyz Law Group, P.C.; G. Victor Treyz; David K. Cole

(57) ABSTRACT

A system such as a vehicle, building, or electronic device system may have a support structure with one or more windows. The support structure and window may separate an interior region within the system from a surrounding exterior region. Control circuitry may receive input such as user input and may adjust an adjustable layer in the window based on the input. The adjustable layer may have a polymer matrix layer with embedded cells. The cells may include intermixed guest-host liquid crystal cells and liquid crystal cells. The guest-host liquid crystal cells and liquid crystal cells may have different liquid crystal materials and/or different sizes that allow the guest-host liquid crystal cells and liquid crystal cells to electrically switch states at different respective threshold voltages. Based on the user input or other input the control circuitry can adjust a drive signal across the adjustable layer to change light transmittance and haze.

20 Claims, 9 Drawing Sheets

Related U.S. Application Data

(60) Provisional application No. 63/075,730, filed on Sep. 8, 2020.

(51) Int. Cl.
*B60J 3/04* (2006.01)
*G02F 1/01* (2006.01)
*G02F 1/1334* (2006.01)
*G02F 1/137* (2006.01)

(52) U.S. Cl.
CPC .... *G02F 1/133365* (2013.01); *G02F 1/13725* (2013.01); *G02F 1/13737* (2013.01); *G02F 2203/01* (2013.01)

(58) Field of Classification Search
CPC .. G02F 2203/01; G02F 1/13475; B60J 3/007; B60J 3/04
See application file for complete search history.

(56) References Cited

U.S. PATENT DOCUMENTS

| | | |
|---|---|---|
| 8,144,275 B2 | 3/2012 | Zhang et al. |
| 9,116,370 B2 | 8/2015 | Taheri et al. |
| 9,229,253 B2 | 1/2016 | Schwartz et al. |
| 10,625,580 B1 | 4/2020 | Jones et al. |
| 11,598,985 B1 * | 3/2023 | Chen .................. G02F 1/13475 |
| 2014/0226096 A1 | 8/2014 | Taheri et al. |
| 2015/0349028 A1 | 12/2015 | Lee et al. |
| 2017/0336663 A1 | 11/2017 | Hakemi et al. |
| 2018/0188561 A1 | 7/2018 | Wang |
| 2019/0203121 A1 | 7/2019 | Eo et al. |

* cited by examiner

US 12,007,639 B2

SYSTEMS WITH ADJUSTABLE WINDOW TRANSMISSION AND HAZE

This application is a continuation of U.S. patent application Ser. No. 17/466,269, filed Sep. 3, 2021, which claims the benefit of provisional patent application No. 63/075,730, filed Sep. 8, 2020, which are hereby incorporated by reference herein in their entireties.

FIELD

This relates generally to structures that pass light, and, more particularly, to windows.

BACKGROUND

Windows such as vehicle windows sometimes include glass layers. To enhance privacy or block sunlight, windows may sometimes be tinted.

SUMMARY

A system such as a vehicle, building, or electronic device system may have a support structure with one or more windows. The support structure and window may separate an interior region within the system from a surrounding exterior region. Control circuitry and input-output devices may be mounted within the support structure.

During operation, the control circuitry may use the input-output circuitry to receive input. The input may be, for example, user input such as input from a vehicle occupant.

Based on the input, the control circuitry may adjust an alternating-current (AC) drive signal (e.g., an AC voltage) or other control signal for an adjustable layer in the window. The adjustments to the drive signal may be used to adjust the amount of light transmission exhibited by the adjustable layer and the amount of haze exhibited by the adjustable layer. The adjustable layer may be placed two or more different modes of operation such as a dark hazy mode, a dark non-hazy mode, a clear hazy mode, and a clear non-hazy mode.

The adjustable layer may be formed from a layer of polymer matrix material sandwiched between first and second transparent conductive electrode layers. The control circuitry can adjust the control signal applied to the adjustable layer by the electrodes to adjust the operating mode of the adjustable layer.

The polymer matrix material may include embedded guest-host liquid crystal cells. The guest-host liquid crystal cells may include a first liquid crystal material and dichroic dye. The polymer matrix material may also include embedded liquid crystal cells having a second liquid crystal material without dichroic dye. The first and second liquid crystal materials may have different properties (e.g., different values of dielectric anisotropy divided by elastic constant) so that the guest-host liquid crystal cells and the liquid crystal cells switch at different threshold voltage levels. The guest-host liquid crystal cells and liquid crystal cells may also be provided with properties that vary differently as a function of frequency. By adjusting the amplitude and/or frequency of the AC voltage signal applied to the polymer layer by the electrode layers, the operating mode and optical properties of the adjustable layer can be adjusted (e.g., the haze and transmission of the adjustable layer can be independently adjusted even when the guest-host liquid crystal cells and the liquid crystal cells are interspersed among each other within the same polymer matrix).

DETAILED DESCRIPTION

A system may have windows. The windows may include electrically adjustable layers. An electrically adjustable layer may have adjustable optical properties. An adjustable layer may, as an example, have guest-host liquid crystal cells and liquid crystal cells (i.e., non-guest-host cells) embedded in a polymer matrix that may be used to provide the adjustable layer with adjustable amounts of haze and light transmission.

Systems that may be provided with windows and other transparent structures having electrically adjustable layers may include buildings, vehicles, electronic devices systems (e.g., head-mounted devices such as glasses with adjustable lenses), and other suitable systems. Illustrative configurations in which systems such as vehicles are provided with electrically adjustable window layers may sometimes be described herein as an example. This is merely illustrative. Adjustable layers may be formed in any suitable systems.

An electrically adjustable layer may be formed using a polymer layer (sometimes referred to as a matrix, polymer matrix, or polymer matrix layer) in which numerous cells of guest-host liquid crystal material and numerous cells of liquid crystal material have been embedded. Each guest-host cell may include liquid crystal material (the "host") and dichroic dye (e.g., anisotropic dye molecules that serve as the "guest"). The dye molecules align with liquid crystals in the liquid crystal material so the orientation of the dye molecules can be controlled by controlling the orientation of the liquid crystals. Each liquid crystal cell may include liquid crystal material without dichroic dye.

Transparent electrodes may be used to apply a desired electric field through the polymer layer. For example, the control circuitry may adjust a voltage applied across the transparent electrodes to adjust the electric field in the polymer layer, thereby adjusting the operating mode of the adjustable layer. Control of the signal applied to the electrodes and therefore the signal applied to the polymer layer allows the alignment state of the liquid crystals in the guest-host cells to be adjusted and allows the alignment state of the liquid crystals in the liquid crystal cells to be adjusted. Various operating modes characterized by different amounts of light transmission and haze can be achieved. For example, an adjustable layer that includes both guest-host liquid crystal cells and non-guest-host liquid crystal cells can be placed in a dark hazy mode that offers a high level of privacy or a clear low-haze mode that offers good through-window visibility. These operating modes and/or other operating modes such as a low-haze low-light-transmittance mode and a high-haze high-light-transmittance mode, may be achieved by adjusting the drive signal amplitude and/or frequency (e.g., based on user input such as vehicle occupant input and/or other input).

Figure 1:
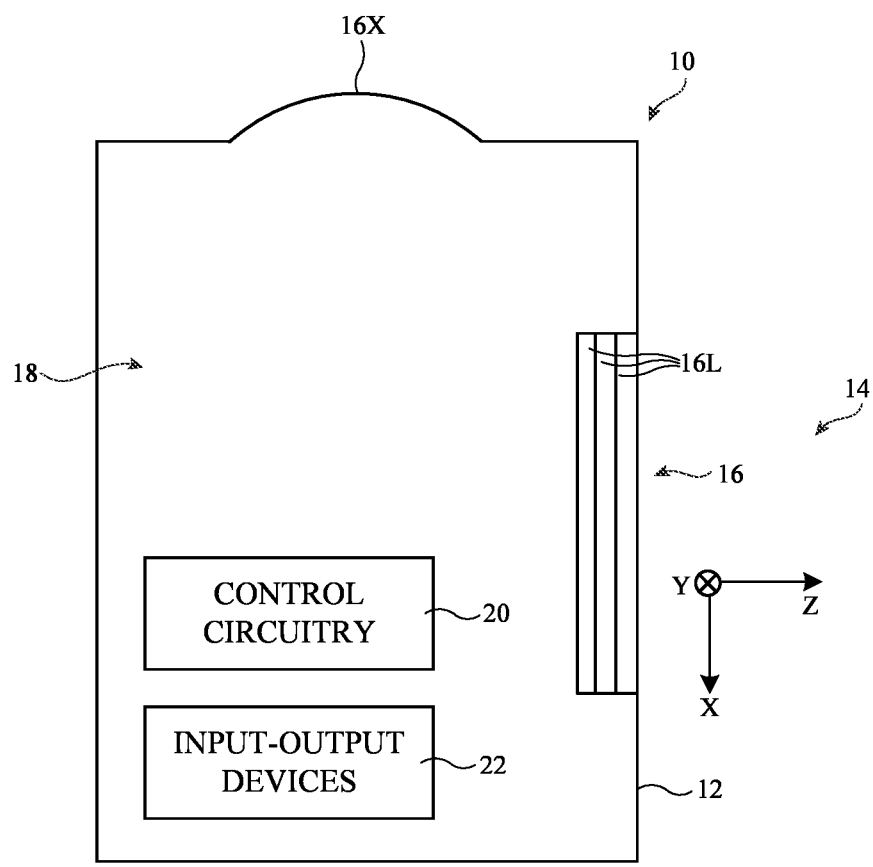
FIG. 1 is a schematic diagram of an illustrative system in accordance with an embodiment.

An illustrative system of the type that may include adjustable windows is shown in FIG. 1. As shown in FIG. 1, system 10 may have a support structure such as support structure 12 that supports one or more windows such as window 16. Support structure 12 and window 16 separate interior region 18 from exterior region 14. The amount of haze and light transmission through window 16 may be adjusted during operation. During at least some operating modes, window 16 may be transparent to allow occupants of system 10 who are located within interior region 18 to view objects located in exterior region 14 through window 16.

Structure 12 may form walls of a building, a vehicle body, an electronic device housing (e.g., a frame for a pair of glasses) or other supporting structures. In arrangements in which structure 12 forms a vehicle body, structure 12 may include a chassis to which wheels, propulsion systems, steering systems, and other vehicle systems are mounted and may include doors, trunk structures, a hood, side body panels, a roof, and/or other body structures.

System 10 may include control circuitry 20 and input-output devices 22. Input-output devices 22 may include sensors (e.g., touch sensors, a microphone, buttons, etc.), audio components, displays, and other components for providing output to an occupant of system 10, for making measurements of the environment surrounding vehicle 10, and for gathering input from an occupant of system 10. Control circuitry 20 may include storage and processing circuitry such as volatile and non-volatile memory, microprocessors, application-specific integrated circuits, digital signal processors, microcontroller, and other circuitry for controlling the operation of system 10. In scenarios in which system 10 is a vehicle, control circuitry 20 may control the components of the vehicle based on user input and other input from input-output device 22 (e.g., to adjust the vehicle's steering, brakes, throttle, and other controls associated with driving the vehicle and/or to adjust optical properties for window 16 and/or other settings associated with operations other than driving the vehicle). If desired, system 10 may be an autonomously driven vehicle. Window settings such as window transparency and haze may be adjusted using voice comments, button input, touch screen input on a control panel or a touch sensitive window area, and/or other input (e.g., vehicle occupant input).

As shown in FIG. 1, window 16 may include multiple window layers 16L. Window layers 16L may include layers of transparent material such as transparent layers of glass, transparent layers of polymer, transparent semiconductor layers (e.g., transparent indium tin oxide layers or other transparent conductive layers), transparent polymer layers, and/or other transparent layers. These layers may include rigid and/or flexible materials. In some configurations, layers 16L and window 16 are flat. In other configurations, some or all of window 16 is curved. As an example, illustrative window 16X of FIG. 1 may have a curved cross-sectional profile and may optionally exhibit areas with compound curvature (e.g., areas where window 16X has non-developable surfaces). Illustrative arrangements in which window 16 has a planar shape may sometimes be described herein as an example.

Window layers 16L may include one or more adjustable layers. Layers 16L may also include one or more structural layers. As an example, window layers 16L may include multiple structural glass layers. In some configurations, these layers may include an inner transparent structural layer (sometimes referred to as an inner glass layer) and an outer transparent structural layer (sometimes referred to as an outer glass layer). Optional additional layers may be included. The inner and outer layers of the window and/or other layers 16L may include adjacent layers that are separated by an air gap and/or may include adjacent layers that are spaced apart by a gap that is filled with polymer, liquid, other dielectric, layers forming an adjustable light transmission device, etc. As an example, layers 16L may include an outer window layer, an inner window layer, and an adjustable layer sandwiched between the outer layer without air gaps.

Layers 16L (e.g., inner and/or outer structural glass layers surrounding an adjustable light transmission layer) may include single-layer glass layers (e.g., single layers of tempered glass) or, in some configurations, may include multi-layer structures formed, for example, from first and second glass layers that are laminated together. A laminated glass layer may have a polymer such as polyvinyl butyral (PVB) or a layer of another polymer that joins first and second glass layers to form a sheet of laminated glass. Multi-layer glass structures (laminated glass layers formed from two or more laminated glass layers with interposed PVB) and single-layer glass layers may include optional tinting (e.g., dye, pigment, etc.). Polymer layers in laminated glass layers (e.g., PVB layers) may also optionally be tinted.

Adjustable light transmission and haze may be provided using electrically adjustable guest-host liquid crystal material and non-guest-host liquid crystal material (sometimes referred to as liquid crystal material). To help avoid undesirable uniformity issues such as gravity-induced mura as well as undesired pressure sensitivity, the guest-host liquid crystal material and non-guest-host liquid crystal material may be formed in nanosized cells embedded within a polymer matrix layer.

Figure 2:
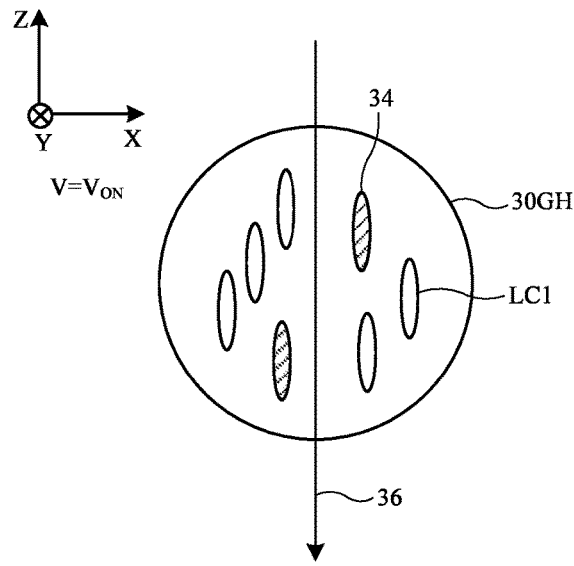
FIGS. 2 and 3 are cross-sectional side views of an illustrative guest-host liquid crystal cell in an adjustable window layer in accordance with an embodiment.
Figure 3:
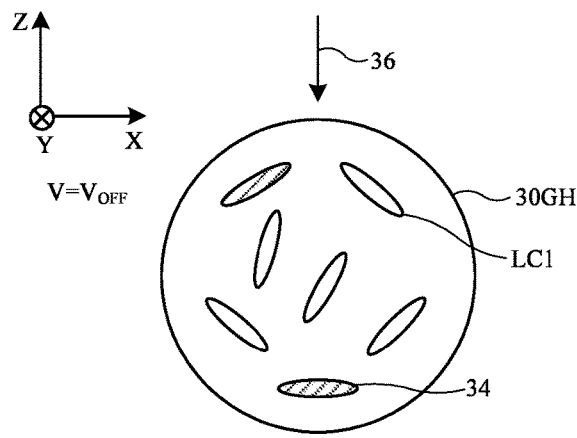
Figure 4:
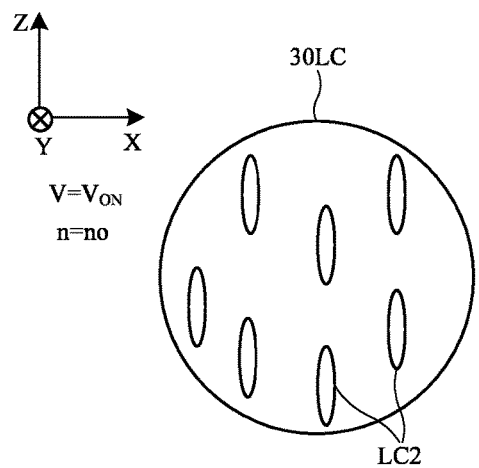
FIGS. 4 and 5 are cross-sectional side view of an illustrative liquid crystal cell without dichroic dye in an adjustable window layer in accordance with an embodiment.
Figure 5:
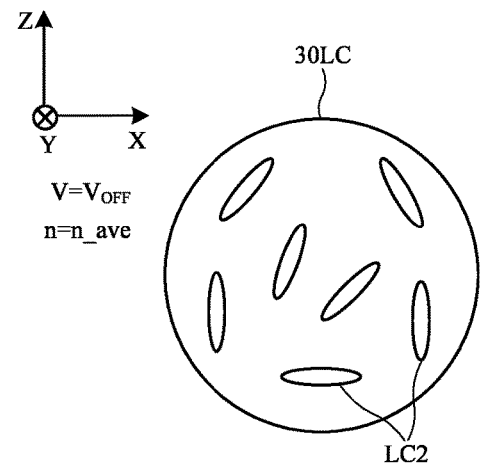

FIGS. 2 and 3 show illustrative guest-host liquid-crystal cells 30GH. FIGS. 4 and 5 show illustrative liquid crystal cells 30LC. Cells 30GH and cell 30LC may be spheres or droplets of other shapes that are formed within a polymer matrix. The size (e.g., the diameter) of cells 30GH and 30LC may be the same or may differ. In some illustrative configurations, cells 30GH and cells 30LC may have diameters of less than 200 nm, less than 150 nm, or other small size to help reduce light scattering. In some configurations, larger cells may be used.

As shown in FIGS. 2 and 3, cells 30GH include a first liquid crystal material (liquid crystals) LC1 and dichroic dye 34 (e.g., dye that exhibits anisotropic light absorption). There is typically more liquid crystal material in cells 30GH than dye material (e.g., the dye may make up about 2-3% of cells 30GH). The orientation of liquid crystals LC1 can be adjusted by adjusting the electric field applied to liquid crystals LC1. The orientation of dye molecules 34 tracks that of liquid crystals LC1. The light transmission exhibited by cells 30GH (and therefore the transmission of an adjustable layer formed from cells 30GH) is high (e.g., at least 60% at least 75%, at least 85%, at least 90%, at least 95%, at least 99%, 100%, etc.) when a control signal (e.g., an AC drive voltage VON) is applied so that liquid crystals LC1 and dye molecules 34 are aligned in a first state (e.g., parallel to the direction of incoming light rays such as illustrative light ray 36 in the example of FIG. 2) and this light transmission is low (e.g., less than 50%, less than 25%, less than 15%, less than 10%, less than 5%, 0%, etc.) when the control signal (e.g., an AC drive voltage signal VOFF of 0V, a value less than 1V, or other low value) is applied so that liquid crystals LC1 and dye molecules 34 are aligned in a second state (e.g., when liquid crystals LC1 and dye molecules 34 are oriented randomly and are not aligned parallel to light ray 36, as shown in the example of FIG. 3). The low transmission state of cells 30GH may be used to help block exterior sunlight and to help provide vehicle occupants with privacy.

In addition to incorporating cells 30GH into a polymer matrix layer, the polymer matrix layer may be provided with liquid crystal cells 30LC of FIGS. 4 and 5 (e.g., nematic liquid crystal). As shown in FIGS. 4 and 5, cells 30LC contain second liquid crystals LC2, but do not contain dichroic dye. Accordingly, the light transmission of cells 30LC does not change between the on state (V=VON of FIG. 4) and off state (V=VOFF of FIG. 5). Nevertheless, the change in orientation of liquid crystals LC2 changes the index of refraction n of cells 30LC. In the example of FIG. 4, liquid crystals LC2 are aligned along the Z axis and cells 30LC are exhibiting a first refractive index value no. In the example of FIG. 5, drive signal V has been reduced in amplitude (V=VOFF, which may be, for example, 0V, less than 1V, etc.), so liquid crystals LC2 assume a random orientation and the refractive index n of cell 30LC becomes n_ave, which is different than no. The haze contribution of cells 30LC can be varied in this way. When the refractive index of cells 30LC matches that of the surrounding polymer matrix (e.g., within 0.1, within 0.05, or other suitable amount of index matching), light rays passing through the polymer matrix tend not to be scattered (e.g., haze has a low value such as a value less than 1%). When the refractive index of cells 30LC differs from that of the surrounding polymer (e.g., by a mismatch of at least 0.1, at least 0.2, at least 0.3, or other index mismatch value), light passing through the polymer matrix will scatter from cells 30LC and will exhibit haze (e.g., at haze value of at least 10%, at least 25%, at least 50%, at least 80%, or other suitable haze value).

Any suitable drive signal may be used in adjusting cells 30GH and 30LC. In an illustrative configuration, AC voltage drive signals are used (e.g., square wave voltages or other AC signals). The frequency of the AC drive signals may be at least 1 Hz, at least 10 Hz, at least 40 Hz, less than 480 Hz, less than 100 Hz, 10-100 Hz, or other suitable frequency. The peak-to-peak voltage of the drive signal (e.g., the voltage applied from one surface of the adjustable transmission layer to the other by a pair of transparent electrodes) may be at least 10 V, at least 20 V, less than 60 V, less than 40 V, 10-60 V, etc. (e.g., when V=VON), may be 0V, less than 1V, or other low value (e.g., when V=VOFF), and/or may have intermediate amplitudes. The frequency of the drive signal may also be varied, if desired. The drive signal can be adjusted by control circuitry 20 based on user input.

An adjustable light transmission layer may be formed by creating a layer of polymer matrix material that includes embedded guest-host liquid crystal cells 30GH and liquid crystal cells 30LC sandwiched between a pair of opposing conductive electrodes. Optional substrate layers may be used to help support the polymer matrix layer (e.g., during manufacturing). In an illustrative arrangement, guest-host liquid crystal material and liquid crystal material without dichroic dye may be provided with surfactant (e.g., surfactant that helps form a shell that maintains the spherical shape of cells 30GH and 30LC within the polymer matrix). These liquid crystal materials may be dispersed into a liquid polymer matrix solution (liquid polymer precursor material for the polymer matrix). High pressure and/or vibration then may be used to break the guest-host liquid crystal material and liquid crystal material into nanodroplets forming cells 30GH and 30LC. After cells 30GH and 30LC have been embedded throughout the matrix in this way, the liquid polymer of the matrix may be cured (e.g., by application of light such as ultraviolet light and/or high temperature), followed by baking to harden the matrix layer.

If desired, a pair of substrates each of which has been coated with a polymer matrix with embedded cells may be sandwiched together to form an adjustable light transmission layer. Configurations in which cells 30GH and formed in a first sublayer and in which cells 30LC are formed in a second sublayer and in which the first and second sublayers are subsequently joined may also be used.

Figure 6:
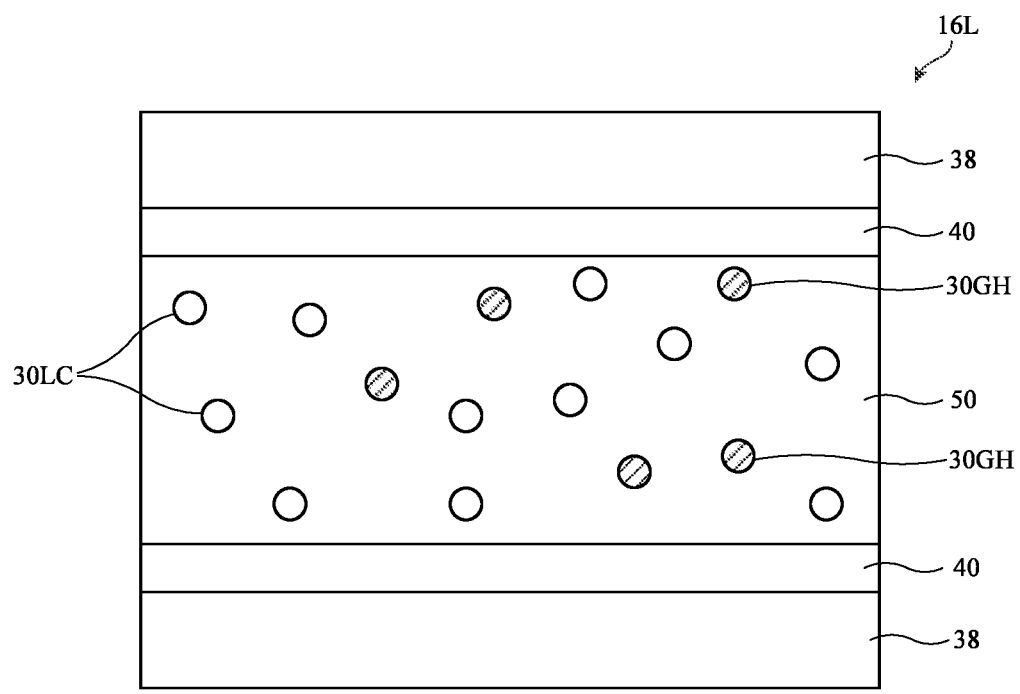
FIG. 6 is a cross-sectional side view of an illustrative adjustable window layer that has guest-host liquid crystal cells and interspersed dye-free liquid crystal cells in a polymer matrix in accordance with an embodiment.

An illustrative adjustable layer with interspersed cells 30GH and 30LC in polymer matrix layer 50 is shown in FIG. 6. As shown in the cross-sectional side view of adjustable layer 16L of FIG. 6, polymer matrix layer 50 may be sandwiched between a pair of transparent conductive electrodes 40. During operation, a drive signal (drive voltage V) may be applied across a pair of terminals that are coupled respectively to electrodes 40. By applying the drive voltage across electrodes 40, the electric field within layer 50 and the electric field applied to cells 30GH and 30LC can be controlled.

Electrodes 40 may, if desired, be supported by substrate layers 38. Substrate layers 38 may be formed from rigid or flexible polymer films (e.g., layers of polyethylene terephthalate, cyclic olefin polymer, cellulose triacetate, polycarbonate, or other polymer materials). These materials and/or other polymers may also be used in forming polymer matrix 50. The thickness of each substrate layer 38 may be, as an example, at least 1 micron, at least 10 microns, at least 100 microns, less than 3 mm, less than 500 microns, less than 150 microns, less than 30 microns, or other suitable thickness. Each electrode 40 may be formed from a transparent conductive layer such as a layer of indium tin oxide, a transparent conductive polymer such as poly(3,4-ethylenedioxythiophene) (PEDOT), or other transparent conductive layer. The thickness of each electrode 40 may be, for example, at least 0.1 micron, at least 1 micron, at least 10 microns, less than 100 microns, less than 20 microns, less than 2 microns, or other suitable thickness.

Polymer matrix 50 and embedded guest-host liquid crystal cells 30GH and embedded liquid crystal cells 30LC, which are interspersed with cells 30GH in a random fashion in the configuration of FIG. 6, may be formed by depositing liquid polymer precursor material for matrix 50 that contains guest-host liquid crystal material and liquid crystal material without dichroic dye onto electrodes 40 followed by application of pressure and/or vibrations to form cells 30 GH and 30LC. The thickness of the layer of matrix 50 that is formed between electrodes 40 may be 4-20 microns (e.g., about 12 microns), at least 1 micron, at least 2 microns, at least 4 microns, at least 8 microns, at least 10 microns, less than 40 microns, less than 30 microns, less than 20 microns less than 15 microns, less than 9 microns, or other suitable thickness).

Layer 16L may be formed from two sublayers that are joined together (each with its polymer matrix material facing the other). The sublayers may be joined using heat and/or pressure and/or may be joined using an interposed layer of adhesive (as examples). Following formation of window 16, window 16 may be installed in a window opening in support structure 12 or other portion of system 10.

The operating modes exhibited by adjustable layer 16L depend on the properties of cells 30GH and 30LC. For example, characteristics of layer 16L such as the sign (positive/negative), amplitude, and/or frequency dependence of the dielectric anisotropy of the liquid crystal materials used in forming liquid crystals LC1 and LC2, the elastic constants of the liquid crystal materials, the indices of refraction of the liquid crystal materials in their aligned and random states relative to the refractive index of matrix 50, the cell sizes of cells 30GH and 30LC, and other factors such as the placement of cells 30GH, cells 30LC, and electrodes 40 within layer 16L, can be selected to tune the behavior of layer 16L.

For example, the relative values of dielectric anisotropy divided by elastic constant of liquid crystals LC1 (in cells 30GH) and liquid crystals LC2 (in cells 30LC) can be selected to configure the switching thresholds associated with changes in light absorption and haze for layer 16L as desired. The larger the dielectric anisotropy divided by elastic constant ($\Delta\varepsilon/K$) of a given liquid crystal, the smaller the electric field needed to make that given liquid crystal respond to the electric field. If, for example, $\Delta\varepsilon/K$ for LC1 is less than $\Delta\varepsilon/K$ for LC2, the electric field switching threshold for LC2 (e.g., switching voltage threshold VT2 across the adjustable layer) will be less than the electric field switching threshold (switching voltage threshold VT1 across the adjustable layer) for LC1.

FIGS. 7, 8, 9 10, 11, 12, 13, 14, 15, 16, and 17 are graphs of illustrative operations associated with illustrative adjustable window layers 16L in various different configurations. In these examples, the polymer refractive index (polymer n) represents the index of refraction of polymer matrix layer 50, $\Delta\varepsilon/K$ represents the values of dielectric anisotropy divided by elastic constant of the liquid crystal material in cells 30GH (LC1) and cells 30LC (LC2). The haze of the adjustable layer (layer 16L in window 16) is represented by solid lines and the transmittance of the adjustable layer is represented by dashed lines. The voltages at which the liquid crystal materials switch (sometimes referred to as threshold voltages) are determined by values of dielectric anisotropy $\Delta\varepsilon$ divided by elastic constant K for each material.

Figure 7:
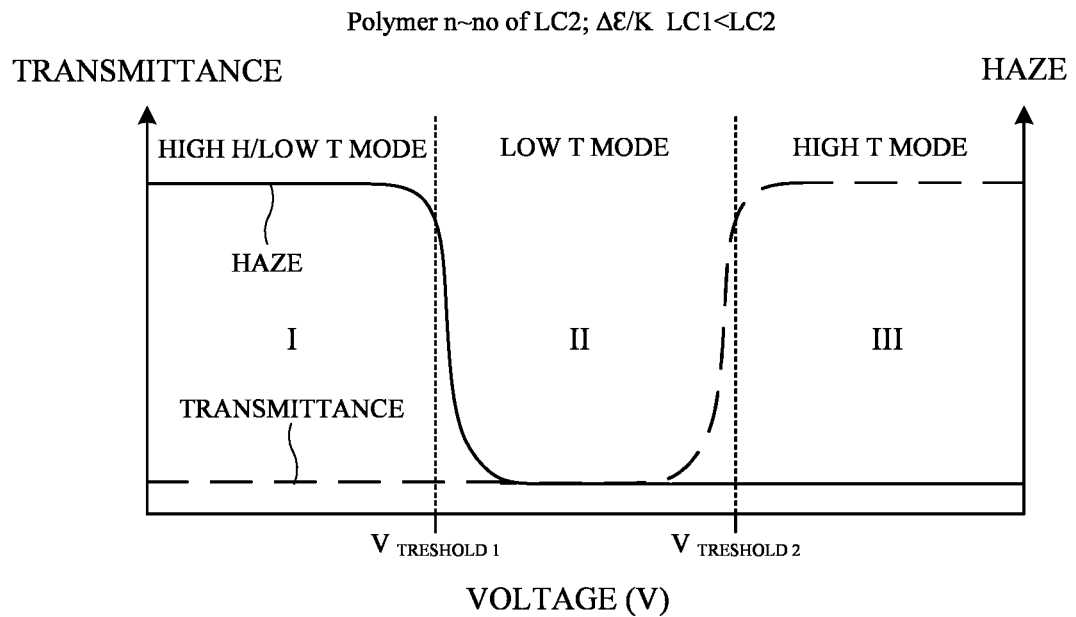
FIGS. 7, 8, 9 10, 11, 12, 13, 14, 15, 16, and 17 are graphs of illustrative operations associated with illustrative adjustable window layers in accordance with embodiments.

In the example of FIG. 7, the $\Delta\varepsilon/K$ value of LC1 is less than that of LC2, so cells 30LC switch state at threshold voltage Vthreshold1 (sometimes referred to as VT1) and cells 30GH switch state at larger threshold voltage Vthreshold2 (sometimes referred to as VT2). The drive voltage V can be set by control circuitry 20 to a value between 0V and VT1 (operating mode I), a value between VT1 and VT2 (operating mode II), or a value above VT2 (operating mode III). Polymer matrix layer 50 has an index n equal to index no of LC2, so cells 30LC will not scatter light and haze will be low when V is greater than VT1 (e.g., when LC2 has become aligned as shown in FIG. 4). Haze will be high when V is less than VT1 and LC2 is randomly oriented as shown in FIG. 5. Cells 30GH are transparent when LC1 is aligned as shown in FIG. 2 (V>VT2) and absorb light to make layer 16L dark when LC1 are not aligned and are randomly oriented as shown in FIG. 3 (e.g., when V<VT2). As a result, the adjustable layer of FIG. 1 can be operated in three different modes: mode I (when 0V<V<VT1), mode II (when VT1<V<VT2), and mode III (VT2<V). In mode I, light absorption is high (layer 16L is dark) and haze is high (layer 16L is hazy). The resulting dark and hazy appearance of layer 16L may provide enhanced privacy. The high absorption of layer 16L in mode I of FIG. 7 provides a degree of privacy by blocking most (if not all) light. Additional privacy is provided by high haze. During mode II, the adjustable layer exhibits low haze and a dark appearance. During mode III, the adjustable layer is clear and exhibits low haze. The clear low-haze state of the adjustable layer in mode III allows a vehicle occupant to clearly view the exterior environment surrounding system 10 through window 16.

Figure 8:
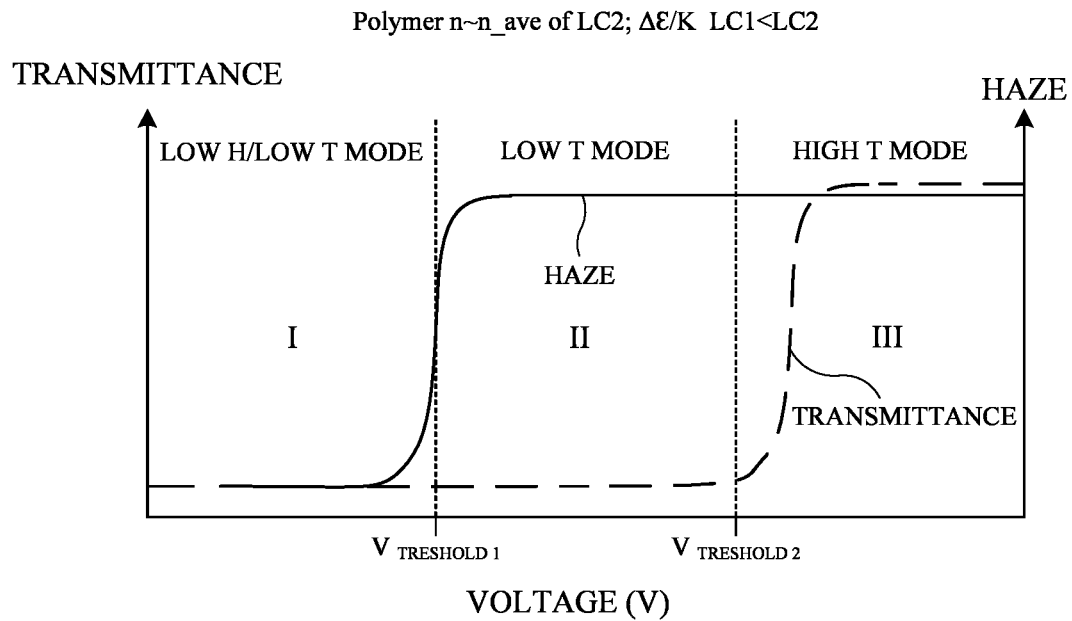

In the example of FIG. 8, the index of matrix layer 50 matches the n_ave index value of LC2 and the switching threshold VT2 of LC1 (cells 30GH) is greater than the switching threshold of LC2 (cells 30LC). In mode I, the adjustable layer of FIG. 8 is dark and exhibits low haze. In mode II, the adjustable layer of FIG. 8 is dark and hazy. In mode III, the adjustable layer is clear and hazy, providing privacy while allowing light to pass through the adjustable layer.

Figure 9:
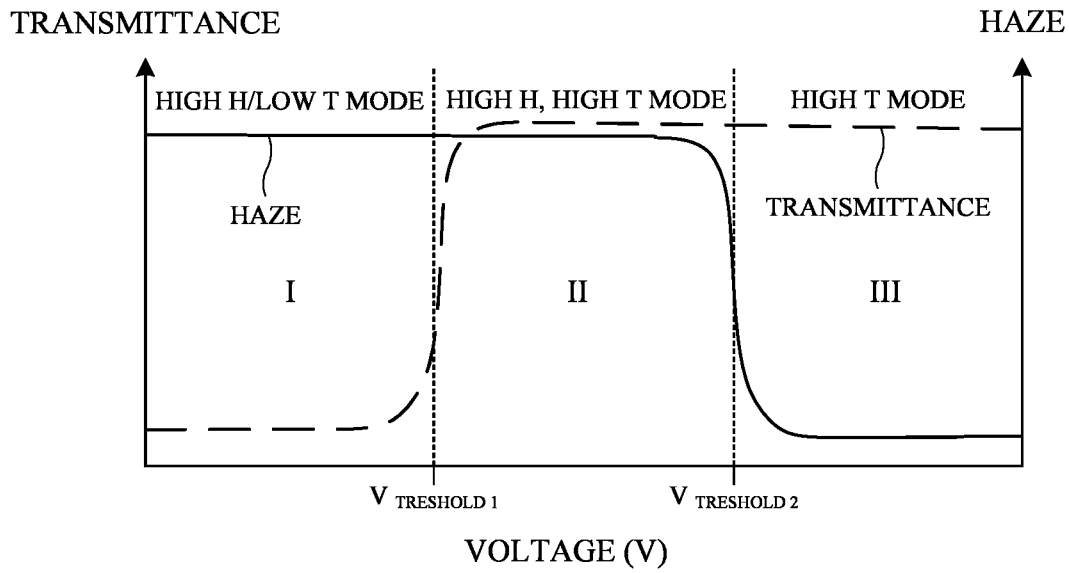

In the example of FIG. 9, the refractive index of matrix layer 50 is matched to index no of LC2, the switching threshold of cells 30GH is VT1, and the switching threshold of cells 30LC is VT2. The adjustable layer of FIG. 9 is dark and hazy in mode I, is hazy and clear (not dark) in mode II, and is clear and not hazy in mode III.

Figure 10:
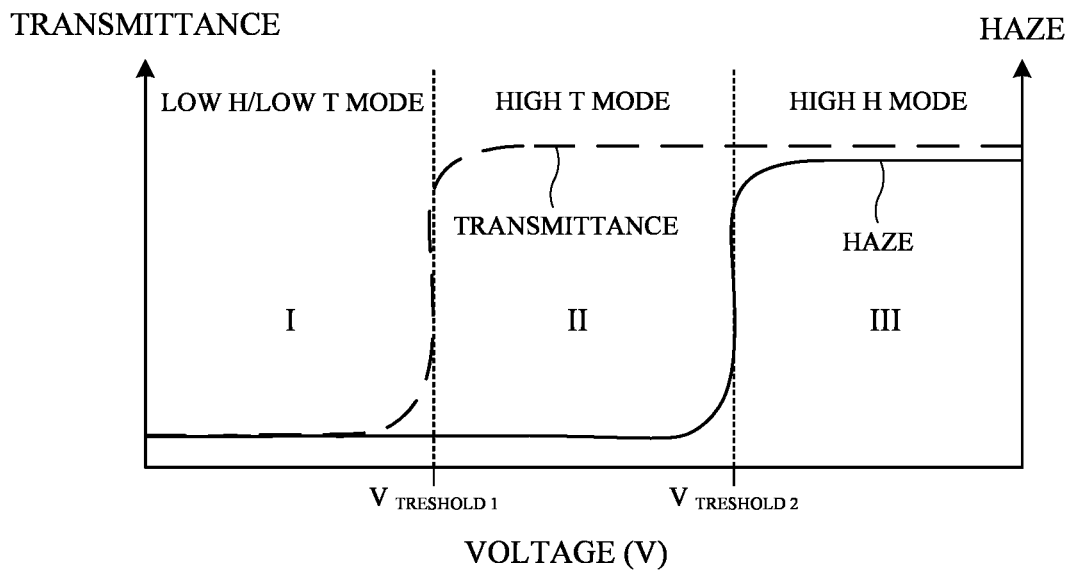

In the illustrative arrangement of FIG. 10, the refractive index of polymer matrix layer 50 is matched to index n_ave of LC2 and the switching threshold VT1 of cells 30GH is lower than the switching threshold VT2 of cells 30LC. The adjustable layer of FIG. 10 is dark with no haze in mode I, is clear with no haze in mode II, and is clear and hazy in mode III.

Figure 11:
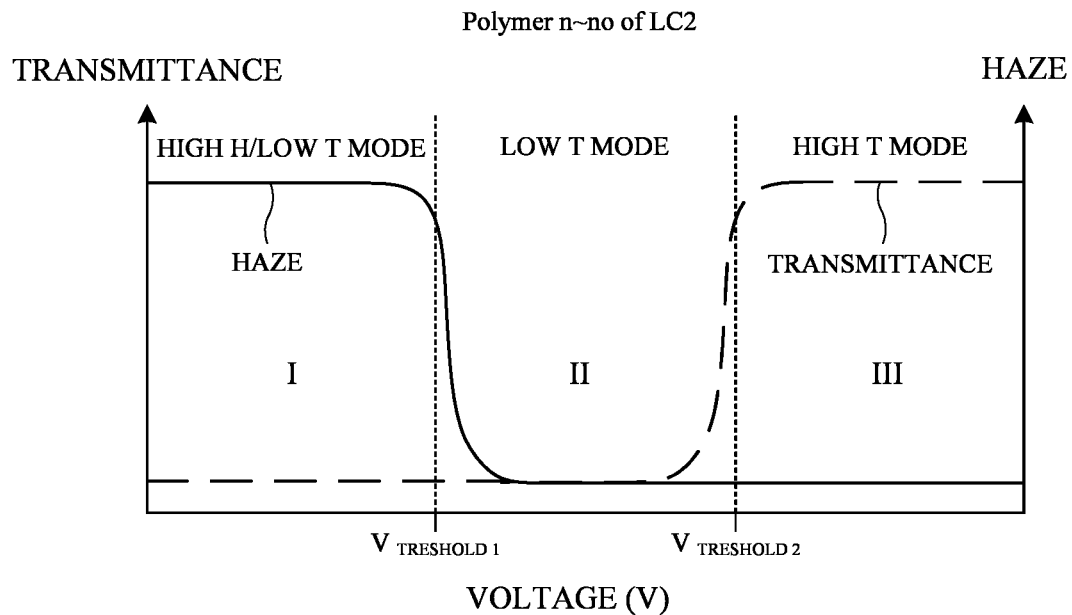
Figure 12:
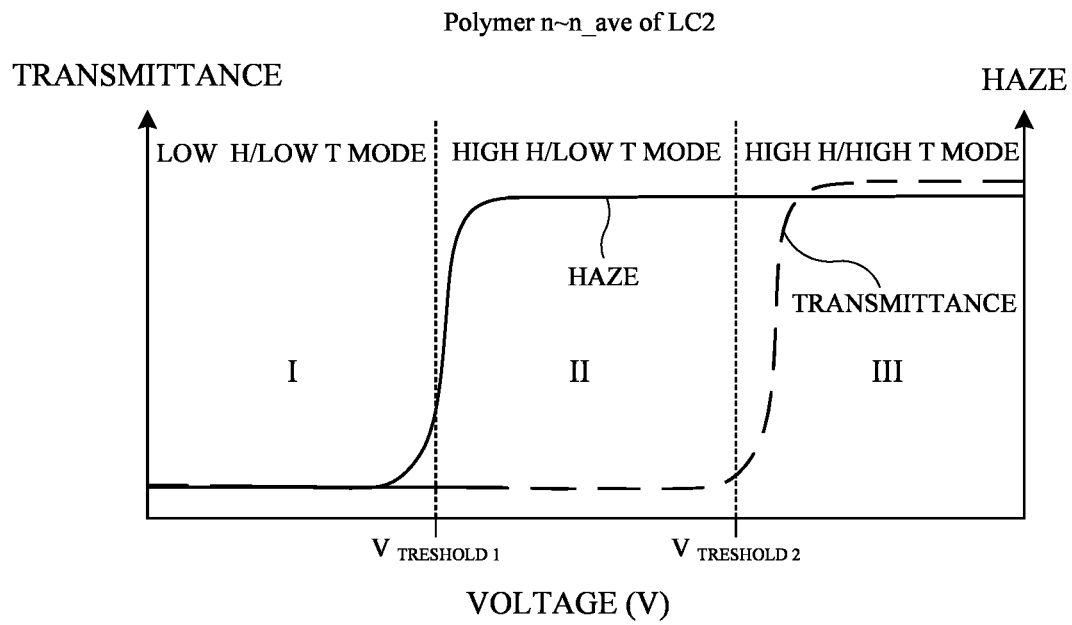

If desired, the diameters of cells 30GH and 30LC may be different. For example, cells 30LC may have larger diameters than cells 30GH. The larger size of cells 30LC may help these cells scatter light when the index of cells 30LC is switched to be different than the index of matrix layer 50 (e.g., when cells 30LC are switched to place the adjustable layer in a high-haze state). With an illustrative arrangement, cells 30GH may be less than 200 nm or less than 150 nm in diameter to help reduce light scattering, whereas cells 30LC may have larger diameters (e.g., at least 210 nm, at least 250 nm, at least 300 nm, etc.) to promote haze formation when haze is switched on. Liquid crystal molecules with larger domain sizes tend to experience lower anchoring energy from surrounding portions of the polymer matrix, lowering their switching threshold voltage. As a result, the increase in size of cells 30LC relative to cells 30GH may tend to lower the switching threshold for LC1. This effect may be used in combination with differences in $\Delta\varepsilon$ to enhance the amount of the difference between the switching threshold for LC1 and LC2 (e.g., LC2 may be provided with a larger $\Delta\varepsilon$ value in addition to placing LC2 in larger cells). FIGS. 11 and 12 illustrate possible configurations where cells 30GH and 30LC differ in size in this way.

In the examples of FIGS. 11 and 12, LC2 has a higher $\Delta\varepsilon$ value than LC1 and the diameter of cells 30LC is larger than cells 30GH. As a result, cells 30LC switch at a lower threshold voltage value VT1 than the switching threshold of cells 30GH. In the FIG. 11 example, the adjustable layer is dark and hazy in mode I, dark with no haze in mode II, and clear with no haze in mode III. In the FIG. 12 example, in which matrix layer 50 has an index matched to n_ave rather than no, the adjustable layer is dark with no haze in mode I, dark and hazy in mode II, and clear and hazy in mode III.

In vertical electric field alignment configurations (see, e.g., cells 30GH and 30LC of FIGS. 2 and 4, respectively), a positive $\Delta\varepsilon$ value is used for switching, because negative $\Delta\varepsilon$ material will not exhibit changes in liquid crystal alignment under applied electric fields. In some configurations, the frequency-dependence of Δε may cause Δε to become negative for some of the liquid crystal material when operating at particular frequencies and may be taken into account in operating the adjustable layer.

Figure 13:
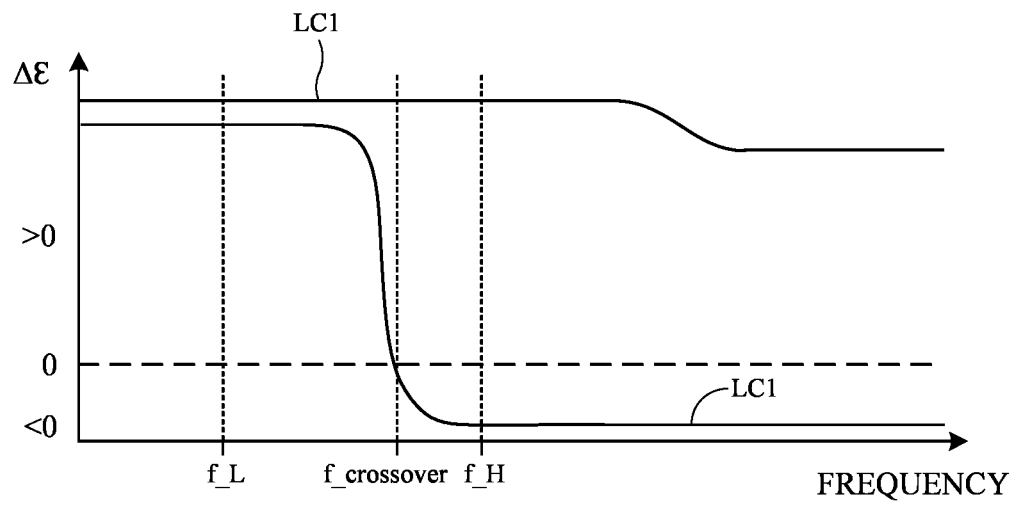
Figure 14:
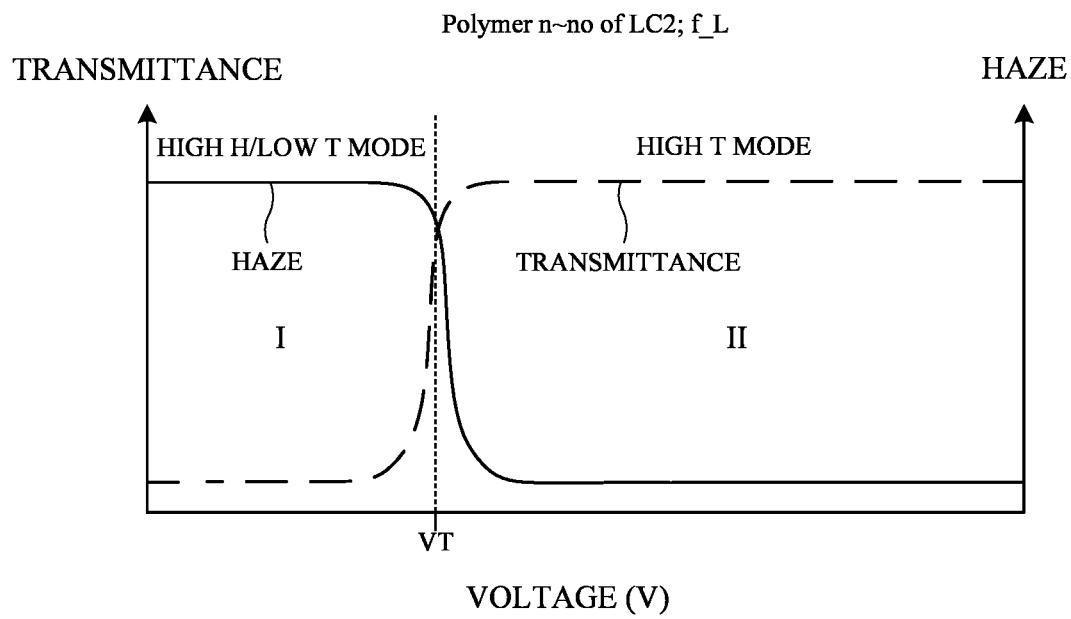
Figure 15:
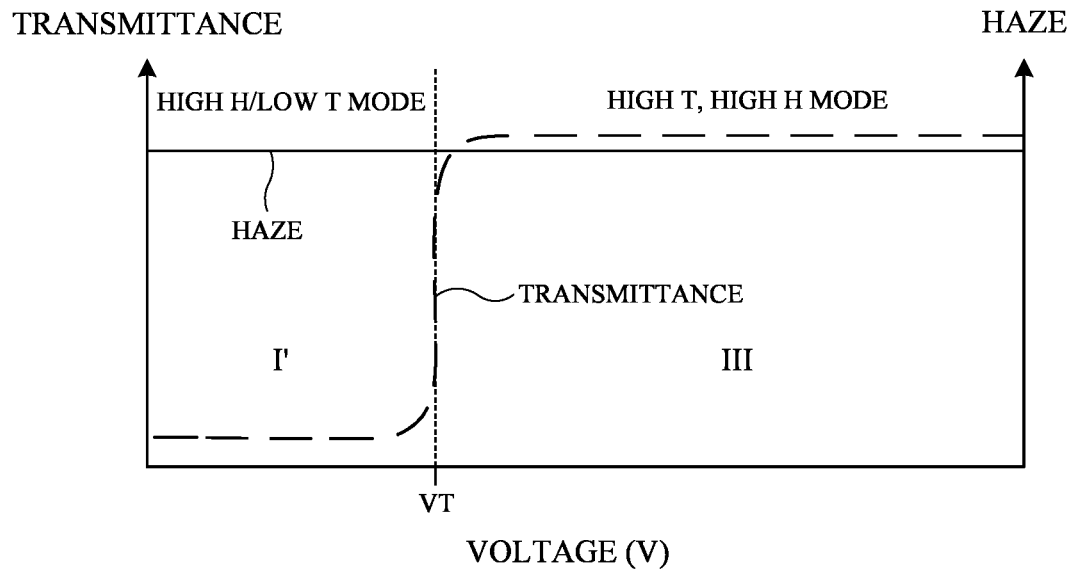
Figure 16:
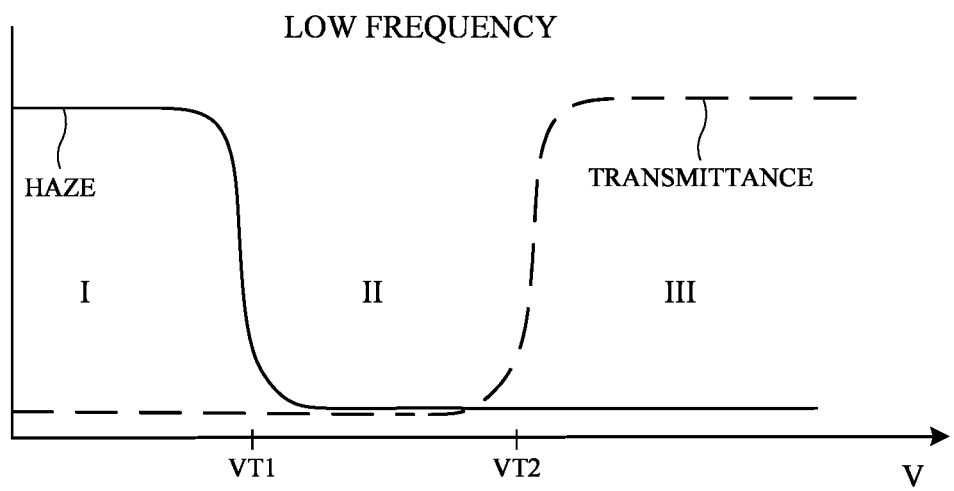
Figure 17:
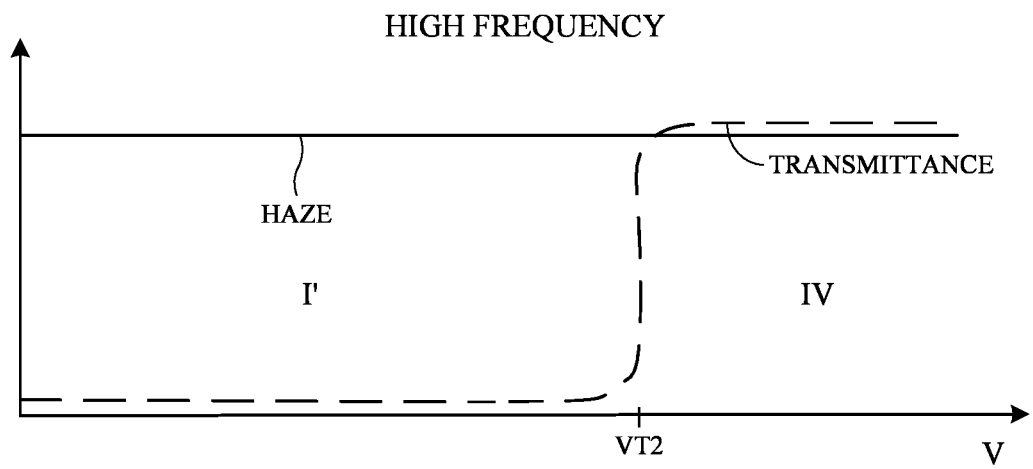

Consider, as an example, the illustrative configuration of FIGS. 13, 14, and 15. As shown in FIG. 13, the frequency dependence of Δε may be different for LC1 and LC2. In the FIG. 13 example, both LC1 and LC2 exhibit positive dielectric anisotropy at low frequency f_L. As a result, both LC1 and LC2 will exhibit switching at or close to the same threshold voltage (threshold voltage VT). At frequencies above crossover frequency f crossover such as at frequency f_H, the Δε value of LC2 becomes negative, whereas the Δε value of LC1 remains positive (and switching threshold VT is substantially unaltered in this example). As a result, both cells 30GH (LC1) and cells 30LC (LC2) will switch at VT when operated at f_L, but only cells 30GH (LC1) will switch at VT when operated at frequency f_H. This behavior is illustrated in FIGS. 13 and 14. In this example, the index of matrix layer 50 is equal to index no of LC2. When the drive signal V applied to the adjustable layer has frequency f_L (FIG. 14), the state of the adjustable layer may be hazy with low transmittance (see, e.g., dark hazy mode I of FIG. 14, where V is less than switching threshold voltage VT) or may be clear (high transmittance) with low haze (see, e.g., mode II of FIG. 14, where V is more than VT). When it is desired to place the adjustable layer in a clear and hazy mode, the frequency of drive signal V may be set to f H and the amplitude of V may be set to be larger than VT (see, e.g., mode III of FIG. 15). When V has a frequency f_H and a voltage below VT, the adjustable layer again operates in a dark and hazy mode (mode I' of FIG. 15, which is similar to mode I of FIG. 14.).

In arrangements in which the liquid crystal materials LC1 and LC2 exhibit a frequency dependence of the type shown in FIG. 13 and also exhibit different positive Δε/K values (and/or are formed in cells of different sizes to tailor their switching threshold values as described in connection with FIGS. 11 and 12), four different operating states may be achieved (low transmittance with high haze, low transmittance with low haze, high transmittance with high haze, and high transmittance with low haze). A transmittance of less than 10% or less than 1% may be considered to be a low transmittance, a transmittance of greater than 90% or greater than 99% may be considered to be high transmittance, a haze of less than 10% or less than 1% may be considered to be a low haze, and a haze of more than 90% or more than 99% may be considered to be a high haze (as examples). Consider, as an example, the arrangement of FIGS. 16 and 17. In this example, cells 30LC switch at VT1 when operated at a low frequency, but do not switch as a function of changes in voltage V when operated at a high frequency (due to a negative Δε at the high frequency). Cells 30GH switch at VT2 at both low and high frequency drive conditions. As a result, when driven at the low frequency (FIG. 16), the adjustable layer may be operated in mode I (e.g., a dark hazy state, sometimes referred to as a low transmittance high haze state) by selecting V<VT1, mode II (a dark non-hazy state, sometimes referred to as a low transmittance low haze state) by selecting VT1<V<VT2, or mode III (a clear non-hazy state, sometimes referred to as a high transmittance low haze state) by selecting VT2<V. When driven at the high frequency (FIG. 17), the adjustable layer may be operated in mode IV (e.g., a clear hazy state, sometimes referred to as a high transmittance high haze state) by selecting VT2<V. Operation at high frequency with V<VT2 is also possible (see, e.g., mode I', which places the adjustable layer in a hazy and dark condition (low transmittance high haze state), as with mode I of FIG. 16).

Figure 18:
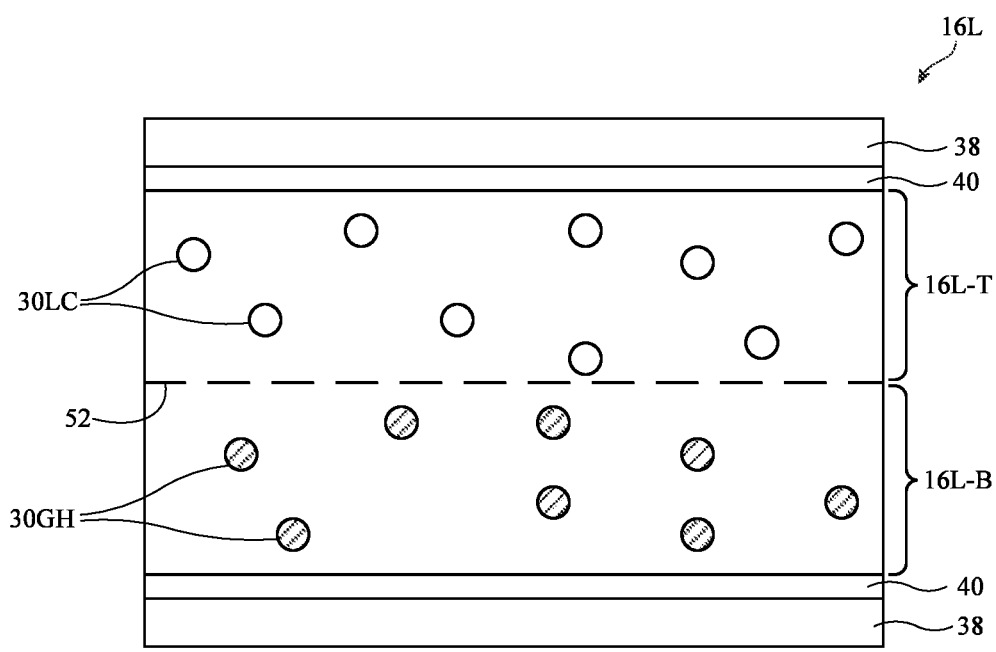
FIG. 18 is a cross-sectional side view of an adjustable window layer formed from a pair of joined sublayers in accordance with an embodiment.

As shown in FIG. 18, adjustable layer 16L for window 16 may be formed from a pair of sublayers such as first sublayer 16L-T and second sublayer 16L-B. These layers may be joined along bond line 52 using heat and/or pressure and/or using an optional layer of adhesive along line 52. The cells of sublayers 16L-T and 16L-B may be the same (e.g., there may be intermixed cells 30GH and 30LC in layer 16L-T and intermixed cells 30GH and 30LC in layer 16L-B) or layer 16L-T may have only a first type of cell (e.g., cell 30LC) and layer 16L-B may have only a second type of cell (e.g., cell 30GH). If desired, an indium tin oxide electrode, conductive polymer layer electrode, or other conductive electrode (e.g., an optional third electrode in addition to electrodes 40) may be formed along line 52 to provide control circuitry 20 with the ability to independently control the voltage across layers 16L-T and 16L-B (e.g., to support operation in four different operating states).

The foregoing is merely illustrative and various modifications can be made to the described embodiments. The foregoing embodiments may be implemented individually or in any combination.

What is claimed is:

1. A window, comprising:
    a first window layer;
    a second window layer; and
    an adjustable layer between the first and second window layers, wherein the adjustable layer comprises a single polymer layer, guest-host liquid crystal cells embedded in the single polymer layer, and liquid crystal cells embedded in the single polymer layer.

2. The window of claim 1, wherein the guest-host liquid crystal cells comprise a first liquid crystal material and a dichroic dye.

3. The window of claim 2, wherein the liquid crystal cells comprise a second liquid crystal material without dichroic dye.

4. The window of claim 3, wherein the second liquid crystal material is different from the first liquid crystal material.

5. The window of claim 1, wherein the adjustable layer comprises first and second transparent conductive electrodes on opposing first and second sides of the single polymer layer.

6. The window of claim 5, wherein the first and second transparent conductive electrodes comprise a material selected from the group consisting of indium tin oxide and conductive polymer.

7. The window of claim 1, wherein the guest-host liquid crystal cells and the liquid crystal cells are intermixed within the single polymer layer.

8. The window of claim 1, wherein the guest-host liquid crystal cells and the liquid crystal cells have diameters of less than 250 nm.

9. The window of claim 1, wherein the guest-host liquid crystal cells are smaller than the liquid crystal cells.

10. The window of claim 1, wherein the guest-host liquid crystal cells have diameters of less than 200 nm and wherein the liquid crystal cells have diameters of at least 250 nm.

11. A window system, comprising:
    a first window layer;
    a second window layer;
    an adjustable layer between the first and second window layers, wherein the adjustable layer comprises a single polymer layer, guest-host liquid crystal cells embedded in the single polymer layer, and liquid crystal cells embedded in the single polymer layer; and first and second electrodes coupled to the single polymer layer, wherein the adjustable layer is configured to be adjusted between a first hazy state and a second hazy state in response to voltage applied to the first and second electrodes.

12. The window system of claim 11, wherein the first hazy state is a dark hazy state and the second hazy state is a clear low-haze state.

13. The window system of claim 12, wherein the adjustable layer is configured to be adjusted between the first and second hazy states in response to first and second different voltages, and wherein the adjustable layer is further configured to be adjusted to a third hazy state in response to a third voltage that is different from the first and second different voltages.

14. The window system of claim 13, wherein the third hazy state is a dark low-haze state or a clear hazy state.

15. The window system of claim 11, wherein the adjustable layer is configured to operate in:
a first mode in which the adjustable layer has a first light transmission level and a first haze level; and
a second mode in which the adjustable layer has a second light transmission level that is greater than the first light transmission level and has a second haze level that is lower than the first haze level.

16. The window system of claim 11, wherein the guest-host liquid crystal cells comprise a first liquid crystal material, the liquid crystal cells comprise a second liquid crystal material, and the first liquid crystal material has a different value of dielectric anisotropy divided by elastic constant than the second liquid crystal material.

17. The window system of claim 11, wherein the guest-host liquid crystal cells have a first diameter and wherein the liquid crystal cells have a second diameter that is greater than the first diameter.

18. A vehicle, comprising:
a support; and
a vehicle window coupled to the support, wherein the vehicle window includes an adjustable window layer and electrodes, and wherein the adjustable window layer includes a single polymer layer coupled to the electrodes, the single polymer layer including:
guest-host liquid crystal cells that have a first liquid crystal material and dichroic dye, and
liquid crystal cells without dichroic dye.

19. The vehicle of claim 18, further comprising:
control circuitry configured to adjust light transmission and haze for the adjustable window layer by adjusting a voltage applied across the single polymer layer with the electrodes.

20. The vehicle of claim 19, further comprising input-output circuitry configured to gather vehicle occupant input, wherein the control circuitry is configured to adjust the voltage based on the vehicle occupant input.

* * * * *